US008532392B2

(12) United States Patent
Fujiwara et al.

(10) Patent No.: US 8,532,392 B2
(45) Date of Patent: Sep. 10, 2013

(54) CONTOUR EXTRACTION DEVICE AND PROGRAM

(75) Inventors: Koichi Fujiwara, Tokyo (JP); Osamu Toyama, Kakogawa (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 121 days.

(21) Appl. No.: 13/379,520

(22) PCT Filed: Mar. 18, 2010

(86) PCT No.: PCT/JP2010/054676
§ 371 (c)(1),
(2), (4) Date: Dec. 20, 2011

(87) PCT Pub. No.: WO2011/004640
PCT Pub. Date: Jan. 13, 2011

(65) Prior Publication Data
US 2012/0099799 A1 Apr. 26, 2012

(30) Foreign Application Priority Data
Jul. 9, 2009 (JP) .................................. 2009-162613

(51) Int. Cl.
*G06K 9/46* (2006.01)
(52) U.S. Cl.
USPC ............................ 382/190; 382/173; 382/203
(58) Field of Classification Search
USPC ......... 382/173, 203, 170, 190, 199; 345/418, 345/582, 619, 632, 640, 643; 600/443
See application file for complete search history.

(56) References Cited

U.S. PATENT DOCUMENTS

| 5,594,849 A | * | 1/1997 | Kuc et al. ....................... 345/632 |
| 6,031,935 A | * | 2/2000 | Kimmel ......................... 382/173 |
| 6,356,272 B1 | * | 3/2002 | Matsumoto et al. ............ 345/582 |
| 6,847,371 B2 | * | 1/2005 | Matsumoto et al. ............ 345/582 |
| 7,106,348 B2 | * | 9/2006 | Matsumoto et al. ............ 345/640 |

FOREIGN PATENT DOCUMENTS

| JP | 5-342353 A | 12/1993 |
| JP | 7-320068 A | 12/1995 |
| JP | 10-11588 | 1/1998 |
| JP | 2000-339452 A | 12/2000 |

OTHER PUBLICATIONS

International Search Report in International Application No. PCT/JP2010/054676, mailed Apr. 13, 2010, 1 page.

* cited by examiner

*Primary Examiner* — Anh Do
(74) *Attorney, Agent, or Firm* — Brinks Hofer Gilson & Lione

(57) ABSTRACT

An object of the present invention is to provide the technology capable of appropriately balancing the preciseness of contour extraction and calculation cost. In order to achieve this object, an energy function setting section sets an energy function that is expressed by a weighted linear sum of a plurality of kinds of energy terms defined correspondingly to a state of an active curve and is formulated so as to have a smaller value as approaching a shape of the contour to be extracted, and an iterative computation processing section minimizes the energy function by an iterative computation. An end instruction section sets an auxiliary function formulated so as to monotonously increase in accordance with the number of iteration times of iterative computation and sets a judging function expressed by a linear sum of the auxiliary function and the energy function. Then, a point of time when a local minimum appears in the judging function in the course of the iterative computation is judged as the end timing of iterative computing.

6 Claims, 14 Drawing Sheets

CONTOUR EXTRACTION DEVICE AND PROGRAM

TECHNICAL FIELD

The present invention relates to the technology of extracting a contour of an object included in an image with the use of the active contour model for extracting a contour by convergence of a curve through iterative deformation.

BACKGROUND ART

In medical practice, meanwhile, various tests and diagnoses are performed by imaging the affected area within the internal organ, skeleton or the like by means of, for example, ultrasonic waves or X-rays. This enables to visually recognize the information of organs or the like of a body, and it is expected to enhance diagnostic accuracy.

Meanwhile, in recent years, there are growing demands for quantitative or automatic diagnosis aided by a computer, and a computer-aided diagnosis (CAD) system using a computer is studied vigorously. In order to perform CAD using a computer, it is important to precisely extract the information necessary for diagnosis, that is, the region of an organ or the like from the image obtained by imaging an affected area.

As the technique of extracting a contour of an object from an image, the technique using an active contour model such as a level set or snakes is known. The active contour model refers to the technique of extracting a contour of an object in an active manner from a curve (active curve) that iterates deformation in accordance with a predetermined deformation mode. The deformation mode of an active curve is defined by the "energy of an active curve" that is a value obtained by quantitatively evaluating the state of a curve. The "energy of an active curve" is predefined so as to be minimized at the time when the active curve extracts a contour of an object. Therefore, a contour of an object can be extracted by deforming the active curve such that the energy of the active curve is minimized and finding the stable state in which the energy is minimized That is, the active contour model is considered to be the technique of extracting a contour of an object by defining an energy function that is minimized when the active curve extracts a contour of an object and finding the stable state in which this energy function is minimized. The process of minimizing an energy function is generally performed by an iterative computation.

The energy of an active curve is expressed by, for example, the function E of (Expression 1) below.

$$E = Wi*Ei + We*Ee \qquad \text{(Expression 1)}$$

That is, the energy function E is defined as a weighted linear sum of a plurality of kinds of energy terms defined correspondingly to the state of the active curve. For example, the energy term (internal energy term) $Ei$ defined from the shape of an active curve itself (for example, smoothness) or the energy term (external energy term) $Ee$ defined from the degree of coincidence between an active curve and a contour of an object can be employed as the energy term. As described above, however, the energy function E needs to be defined to be minimized when the active curve extracts a contour of an object in an appropriate manner, and accordingly each energy term needs to be formulated so as to have a smaller value as the active curve approaches a target shape.

For example, the external energy term $Ee$ is formulated so as to have a smaller value as the degree of coincidence between an active curve and a contour of an object becomes higher. The introduction of the external energy term $Ee$ into the energy function E allows an active curve to be distorted in such a manner of faithfully extracting a contour of an object. However, if the energy function E is defined by the external energy term $Ee$ only, the extracted contour faithfully reproduces noise or the like appearing in an image as well, which makes it difficult to recognize the shape of an object. Therefore, the internal energy term $Ei$ that is formulated so as to have a smaller value as the active curve becomes smoother is introduced into the energy function E. The introduction of the internal energy term $Ei$ into the energy function E allows an active curve to be distorted in such a manner of making the shape of the active curve itself smooth. Two terms of the internal energy term $Ei$ and the external energy term $Ee$ are introduced into the energy function E as described above, and those are balanced in an appropriate manner, whereby it is possible to extract the contour of an object in an appropriate shape.

Note that how to balance a plurality of kinds of energy terms $Ei$ and $Ee$ in the energy function E depends on, for example, an image state, an object shape, smoothness of an object, which is not determined generally. Then, weighting factors $Wi$ and $We$ are added to the energy terms $Ei$ and $Ee$, respectively, and the values thereof are adjusted in accordance with the object shape or the like, thereby adjusting the balance between the respective energy terms $Ei$ and $Ee$. For example, an increased weighting factor $Wi$ of the internal energy term $Ei$ allows the active curve to have a smoother shape at the time when the energy function E is minimized. On the other hand, an increased weighting factor $We$ of the external energy term $Ee$ allows the active curve to capture a contour of an object more faithfully at the time when the energy function E is minimized. In this manner, the state of the curve to be obtained varies depending on a value of a weighting factor.

For example, Patent Document 1 and Non-Patent Document 1 describe the outline of snakes that is one of the representative active contour models.

PRIOR ART DOCUMENTS

Patent Document
   Patent Document 1: Japanese Patent Application Laid-Open No. 10-11588 (1998)
Non-Patent Document
   Non-Patent Document 1: Michihiko Minoh and Akira Amano, "Snakes: past, present and future", Technical Report of PRMU, Vol. 458, No. 12, pp. 81-88, 1997.

SUMMARY OF THE INVENTION

Problem to be Solved by the Invention

As described above, in the active contour model, a contour of an object is extracted by minimizing the preset energy function through an iterative computation or the like. That is, as the number of times of iteration computation increases, the energy function gradually decreases as schematically illustrated in, for example, FIG. 3. Correspondingly, the shape of the active curve approaches the contour of an object. Then, after iteration is performed after a sufficient number of times, the energy function converges to a fixed value. The shape of the active curve correspondingly converges to the stable state, thereby obtaining an active curve that precisely extracts the contour of the object.

Therefore, originally, it is desired in the active contour model that the iterative computation be continued until the energy function converges completely to obtain the active curve when the energy function converges completely. This is because the active contour resultantly obtained has extracted the contour of the object most precisely. The active curve before the energy function converges completely is in the course of distortion, which is not considered to extract the contour of the object precisely.

Generally, the energy function changes more gently as approaching convergence as shown in FIG. 3, and thus the iterative computation has to be performed a considerable number of times for complete convergence, leading to an enormous amount of calculation cost.

The present invention has been made in view of the above, and an object thereof is to provide the technology capable of appropriately balancing the preciseness of contour extraction and calculation cost.

Means to Solve the Problem

In order to solve the above-mentioned problem, a first aspect relates to a contour extraction device that extracts a contour of an object using an active contour model, which includes: an image acquisition section that acquires a target image obtained by imaging a natural object; an initial shape setting section that sets an initial shape of an active curve for extracting a contour of an object appearing on the target image; an energy function setting section that sets an energy function, the energy function being expressed by a weighted linear sum of a plurality of kinds of energy terms defined correspondingly to a state of the active curve and being formulated so as to have a smaller value as approaching a shape of a contour to be extracted; an iterative computation section that minimizes the energy function by an iterative computation; an auxiliary function setting section that sets an auxiliary function formulated so as to change in accordance with the number of iteration times of the iterative computation; and an end timing judgment section that judges an end timing to end the iterative computation based on a transition of the energy function in the course of the iterative computation and a transition of the auxiliary function in the course of the iterative computation.

According to a second aspect, in the contour extraction device according to the first aspect, the auxiliary function is a function formulated so as to monotonously increase in accordance with the number of iteration times.

According to a third aspect, in the contour extraction device according to the second aspect, the auxiliary function is a function whose rate of increase becomes larger in accordance with the number of iteration times.

According to a fourth aspect, in the contour extraction device according to the second or third aspect, the end timing judgment section includes a judging function setting section that sets a judging function expressed by a linear sum of the energy function and the auxiliary function, and the end timing judgment section judges a point of time when a local minimum appears in the judging function in the course of the iterative computation as the end timing According to a fifth aspect, in the contour extraction device according to the second or third aspect, the end timing judgment section judges, as the end timing, a point of time when a value of the energy function is smaller than a value of the auxiliary function in the course of the iterative computation.

A sixth aspect relates to a program that is stored in a computer and is executed in the computer to cause the computer to function as a contour extraction device that extracts a contour of an object using an active contour model, wherein the contour extraction device includes: an image acquisition section that acquires a target image obtained by imaging a natural object; an initial shape setting section that sets an initial shape of an active curve for extracting a contour of an object appearing on the target image; an energy function setting section that sets an energy function, the energy function being expressed by a weighted linear sum of a plurality of kinds of energy terms defined correspondingly to a state of the active curve and being formulated so as to have a smaller value as approaching a shape of a contour to be extracted; an iterative computation section that minimizes the energy function by an iterative computation; an auxiliary function setting section that sets an auxiliary function formulated so as to change in accordance with the number of iteration times of the iterative computation; and an end timing judgment section that judges an end timing to end the iterative computation based on a transition of the energy function in the course of the iterative computation and a transition of the auxiliary function in the course of the iterative computation.

Effects of the Invention

According to any of the contour extraction devices of the first to fifth aspects and the program of the sixth aspect, the end timing to end the iterative computation is judged not only from a transition of the energy function in the course of the iterative computation but also from a transition of the auxiliary function in the course of the iterative computation. That is, the end timing is specified not only from a value of the energy function serving as an indicator of the preciseness of contour extraction but also from the number of iteration times of iterative computation serving as an indicator of calculation cost. This enable to appropriately balance the preciseness of contour extraction and calculation cost.

In particular, according to the contour extraction device of the third aspect, the auxiliary function is a function whose rate of increase becomes larger in accordance with the number of iteration times. This prevents calculation cost from increasing excessively while reliably securing the minimum-required preciseness of contour extraction.

In particular, according to the contour extraction device of the fourth aspect, the judging function expressed by the linear sum of the energy function and the auxiliary function is set. A local minimum appears in the judging function expressed by the linear sum of the energy function that decreases in the course of the iterative computation and the auxiliary function that monotonously increases in the course of the iterative computation, and thus the point of time when the local minimum appears is judged as an end timing. This configuration enables to specify an appropriate end timing with a simple configuration.

In particular, according to the contour extraction device of the fifth aspect, the point of time when the value of the energy function is smaller than the value of the auxiliary value in the course of iterative computation is judged as the end timing. That is, the reference value for judging an end of iterative computation is defined by the auxiliary function formulated so as to monotonously increase in accordance with the number of iteration times of iterative computation. This configuration causes the reference for judging an end to be lenient as the number of iteration times of iterative computation increases, whereby it is possible to prevent calculation cost from increasing excessively even in a case where the energy function is unlikely to decrease.

EMBODIMENTS FOR CARRYING OUT THE INVENTION

<First Embodiment>
<1. Hardware Configuration>

Figure 1:
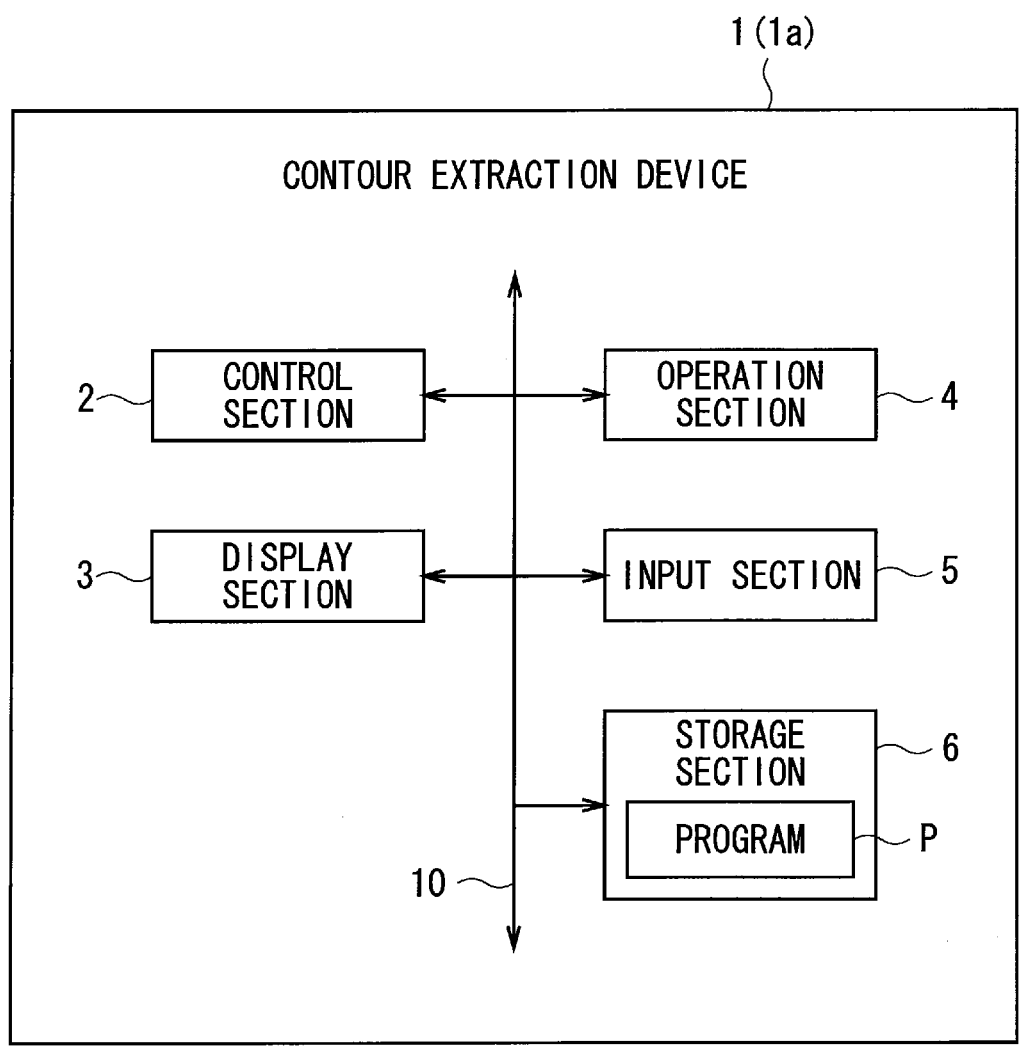
FIG. 1 is a block diagram showing a hardware configuration of a contour extraction device.

The hardware configuration of a contour extraction device 1 according to a first embodiment of the present invention is described with reference to FIG. 1. FIG. 1 is a block diagram showing the hardware configuration of the contour extraction device 1.

The contour extraction device 1 extracts a contour of an object appearing on the image data to be processed (hereinafter, referred to as "target image data") with the use of an active contour model. The contour extraction device 1 is configured as a typical computer and has the configuration in which a control section 2, a display section 3, an operation section 4, an input section 5 and a storage section 6 are connected to a bus line 10.

The control section 2 is configured as, for example, a CPU and executes a program P stored in the storage section 6 to determine the action of the entire contour extraction device 1, thereby providing a command to the entire contour extraction device 1.

The display section 3 is configured as a liquid crystal display or the like and visually outputs, for example, the image data generated in the control section 2.

The operation section 4 is configured as a keyboard, touch panel, mouse or the like, and transmits various command signals to the control section 2 in accordance with various operations of a user.

The input section 5 receives image data that serves as the target image data. The input section 5 may acquire image data in any mode. For example, the input section 5 may receive image data online from an external device, or may acquire image data by data reading from a portable storage medium such as a DVD or reading using a scanner. Alternatively, the input section 5 may acquire image data by reading the image data stored in a file server or the like connected through a network. The input image data is stored in the storage section 6. Note that in the present embodiment, the target image data refers to the image data acquired by imaging natural objects (for example, animals including humans, plants and landscapes).

If the contour extraction device 1 is connected to a medical imaging device, it is possible to use various kinds of image data captured by the medical imaging device as the target image data. For example, an ultrasonic imaging device is one of the devices widely used as the medical imaging device. The ultrasonic imaging device applies ultrasonic waves of 2.5 MHz to 13.0 MHz to a given part of an internal organ or the like of an imaging target people and visualizes its echo, thereby acquiring an ultrasonic image of the part. With this ultrasonic imaging device being connected to the contour extraction device 1, it is possible to receive an ultrasonic image showing the internal organ or the like of an imaging target people captured by the ultrasonic imaging device through the input section 5 and use this as the target image data.

The storage section 6 is configured as a storage device such as a semiconductor memory or hard disk. The storage section 6 stores the program P executed by the control section 2, the information necessary for execution of the program P, and various kinds of information such as the image data input from the input section 5.

<2. Functional Sections Related to Contour Extraction>

Figure 2:
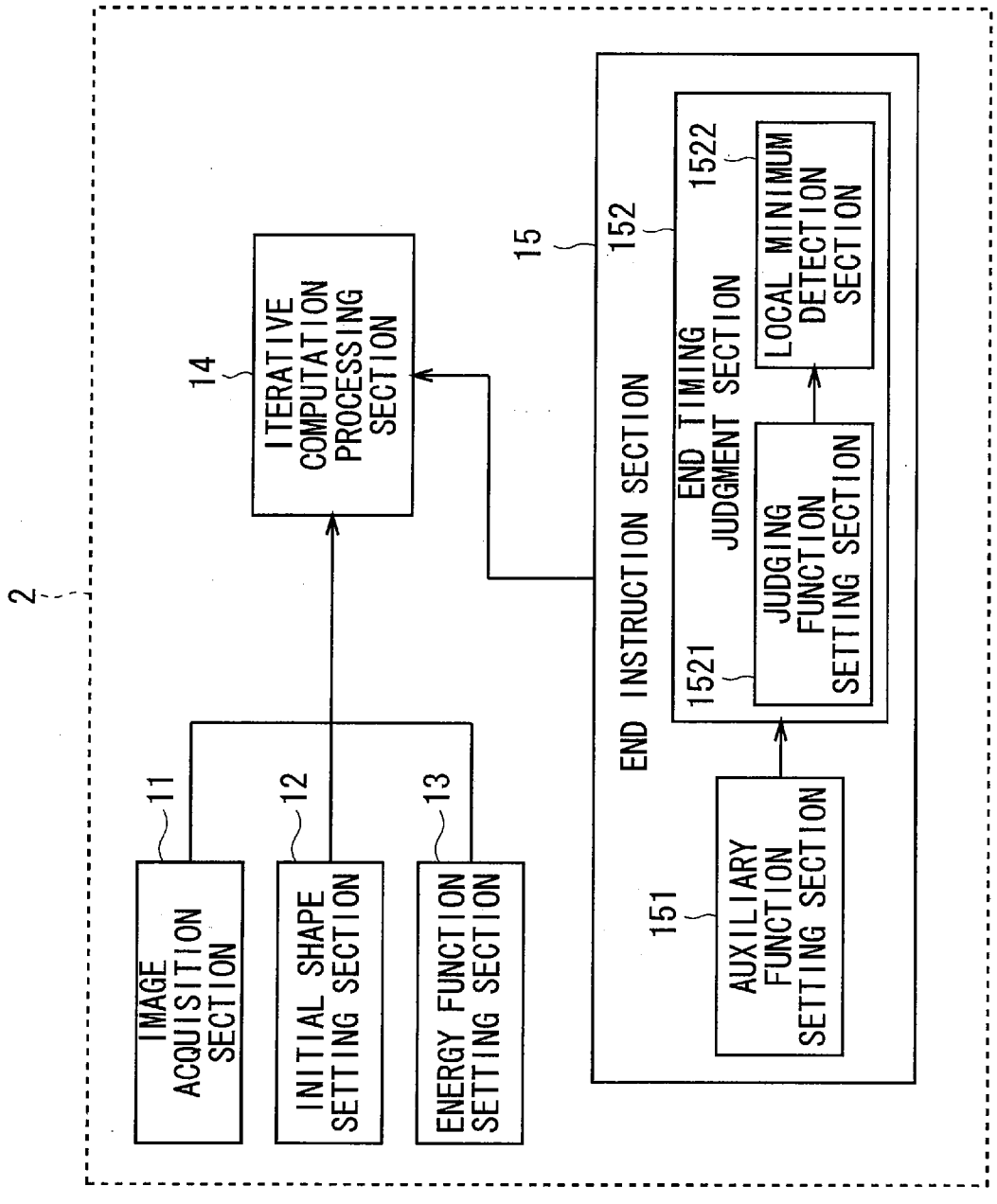
FIG. 2 is a block diagram showing a configuration related to a contour extraction function.
Figure 3:
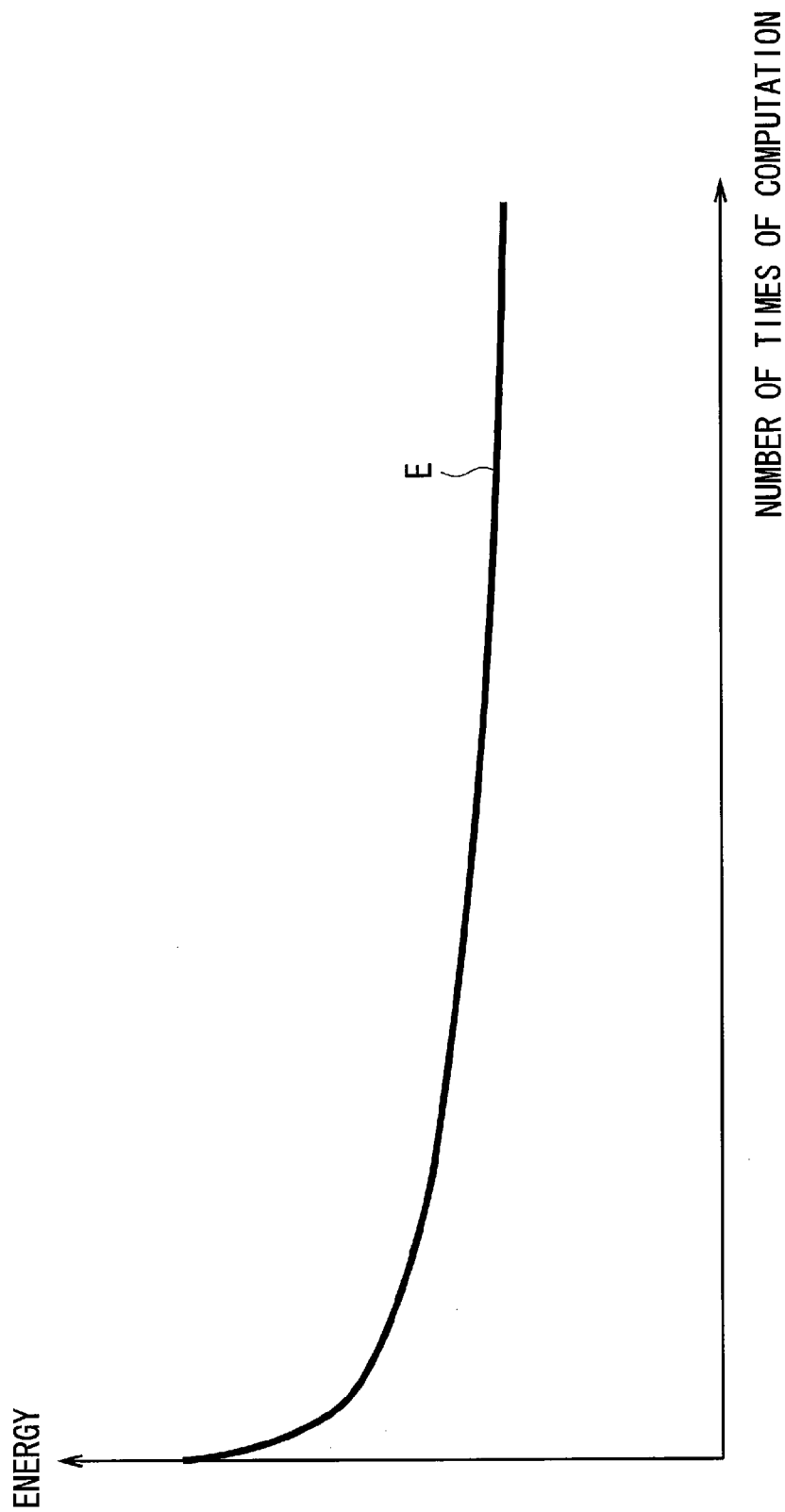
FIG. 3 is a figure schematically illustrating an energy function.
Figure 4:
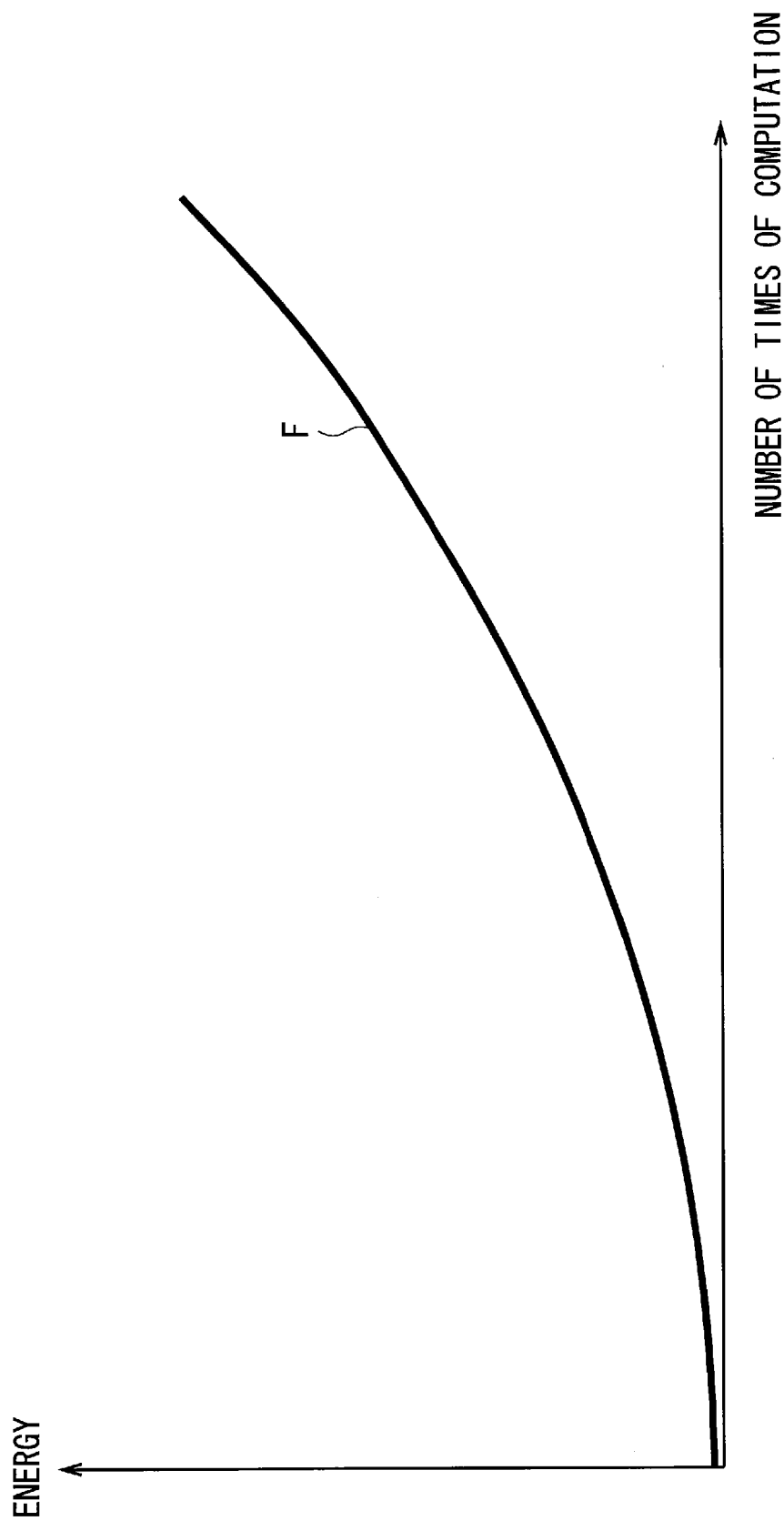
FIG. 4 is a figure schematically illustrating an auxiliary function.
Figure 5:
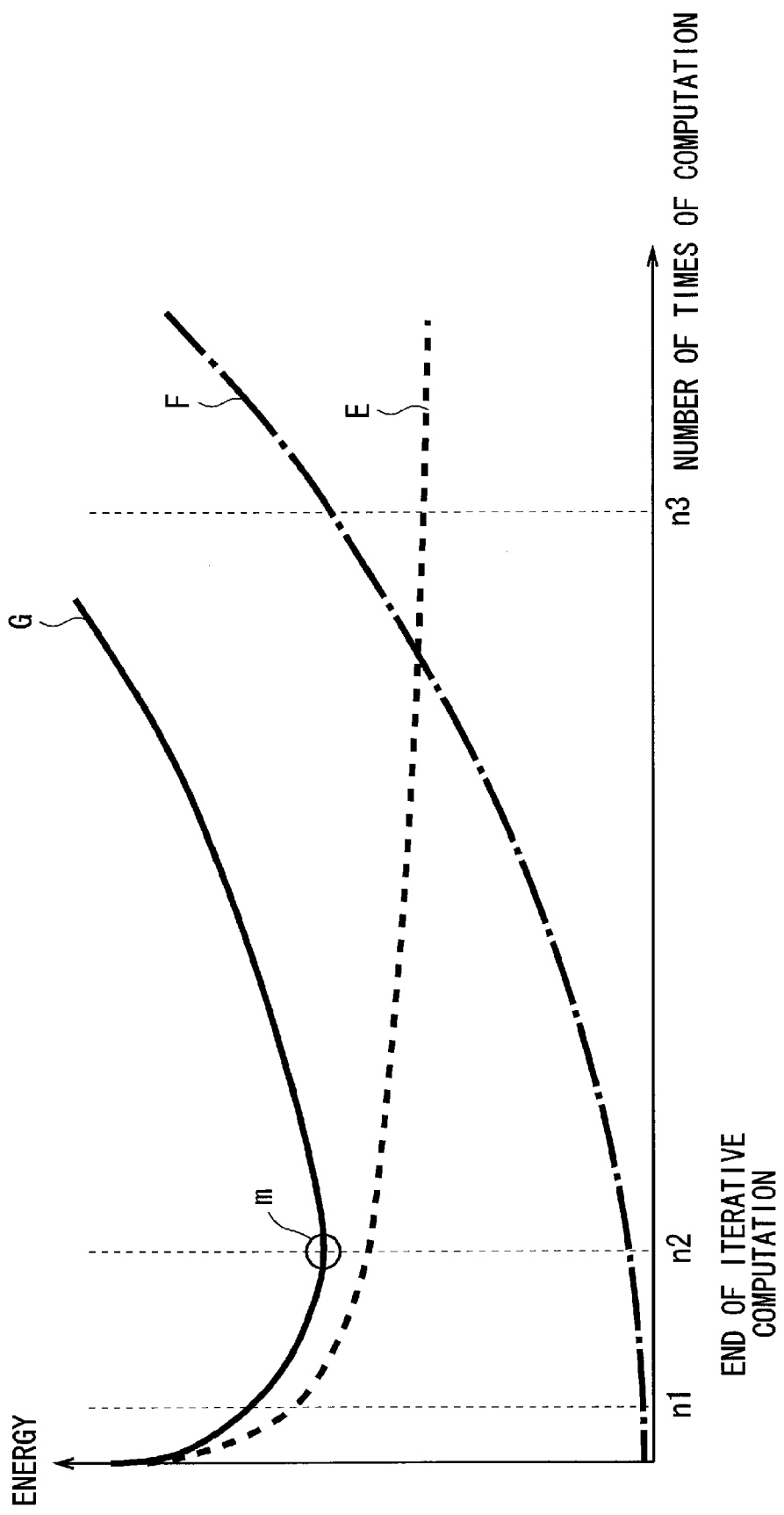
FIG. 5 is a figure schematically illustrating a judging function.

The contour extraction device 1 has a function of extracting a contour of an object appearing on target image data (contour extraction function) with the use of an active contour model. Note that the active contour model is the method of extracting a contour of an object while distorting an active curve as described above. Specifically, a contour of an object is extracted by defining the energy function that is minimized when the active curve extracts a contour of an object and performing the process of minimizing the energy function through iterative computation to find the stable state in which the value of the energy function is minimized The configuration for implementing the contour extraction function is described with reference to FIG. 2. FIG. 2 is a block diagram showing the configuration related to the contour extraction function. In the following description, FIG. 3 to FIG. 5 are appropriately referred to. FIG. 3 to FIG. 5 are figures schematically illustrating an energy function E, an auxiliary function F and a judging function G, respectively.

The contour extraction device 1 includes an image acquisition section 11, an initial shape setting section 12, an energy function setting section 13, an iterative computation processing section 14 and an end instruction section 15 as the configuration related to the contour extraction function. Those respective sections may be implemented through computing performed by the control section 2 in accordance with the program P stored in the storage section 6 or may be implemented by dedicated hardware.

The image acquisition section 11 acquires the target image data. For example, the image acquisition section 11 reads the image data designated by a user from the image data stored in the storage section 6 and acquires the read image data as the target image data.

The initial shape setting section 12 sets the initial shape of the active curve. Specifically, the initial shape setting section 12 causes the display section 3 to display the target image data and receives the shape input by a user through the operation section 4 while the user views the display screen as the initial shape of the active curve. Alternatively, the configuration may be made such that the storage section 6 stores one or more initial shape samples and a user is caused to select any of the stored samples (or the initial shape setting section 12 automatically selects any sample based on, for example, a name assigned to the target image data), whereby the selected sample is read out as the initial shape of the active curve. While the active curve may have any initial shape, a shape as similar to the contour of an object as possible is preferred for efficiently and precisely performing the process related to contour extraction. Note that the active curve in the initial shape is referred to as an "initial active curve" below.

The energy function setting section 13 sets the energy function E. The energy function E is expressed by the weighted linear sum of a plurality of kinds of energy terms defined correspondingly to the state of the active curve. The number of energy terms included in the energy function E and the contents of the respective energy terms can be appropriately set, and in the present embodiment, the energy function E is defined using two kinds of energy terms of an "internal energy term Ei" and an "external energy term Ee". That is, the energy function E according to the present embodiment is a function expressed by (Expression 2) below, where "Wi" and "We" represent weighting factors added to the internal energy term Ei and the external energy term Ee, respectively.

$$E=Wi*Ei+We*Ee \quad \text{(Expression 2)}$$

The energy function E is formulated so as to have a smaller value as approaching the shape of the contour to be extracted. That is, the internal energy term Ei and the external energy term Ee are formulated so as to have a smaller value as the active curve approaches a target shape. For example, the internal energy Ei is formulated so as to have a smaller value as the active curve becomes smoother. The external energy Ee is formulated so as to have a smaller value as the degree of coincidence between the active curve and the contour of an object becomes higher.

How to balance the internal energy term Ei and the external energy term Ee in the energy function E is defined by the weighting factors Wi and We. In the present embodiment, a user determines the values of the weighting factors Wi and We in consideration of a shape expected as the contour of an object, the shape of the contour desired to be extracted or the like and inputs the determined values to the contour extraction device 1 in advance (for example, at initial setting of the contour extraction device 1). The values input by the user on this occasion are stored in the storage section 6, and the energy function setting section 13 sets the energy function E by reading out those values. The method of setting the weighting factors Wi and We is not limited thereto. For example, the configuration may be made such that the values of the weighting factors Wi and We are stored in association with the sample of the initial state and the energy function setting section 13 sets the energy function E by reading out the values of the weighting factors Wi and We associated with the sample of the selected initial shape.

The iterative computation processing section 14 performs the process of minimizing the energy function E through the iterative computation. That is, the active curve is distorted in accordance with the deformation mode defined by the energy function E. Then, the iterative computation processing section 14 receives the instruction indicating that the iterative computation should be ended (end instruction) from an end timing judgment section 152 described below and then ends the iterative computation, to thereby acquire the active curve on this occasion as the active curve that has appropriately extracted the contour of the object (hereinafter, referred to as a "final active curve").

The end instruction section 15 provides the iterative computation processing section 14 with an instruction of ending the iterative computation at a given timing. The end instruction section 15 includes an auxiliary function setting section 151 and an end timing judgment section 152.

The auxiliary function setting section 151 sets the function (auxiliary function F) formulated so as to change in accordance with the number of iteration times of iterative computation (hereinafter, referred to as "number of times of computation"). Specifically, the auxiliary function setting section 151 sets the auxiliary function F formulated so as to monotonously increase in accordance with the number of times of computation. Therefore, the auxiliary function F is the function expressed by (Expression 3) below in the case where the number of times of computation is represented by "n".

$$F=f(n) \text{ (where } f(n1)<f(n2) \text{ in a case where } n1<n2) \quad \text{(Expression 3)}$$

The auxiliary function F may be any function as long as it is a monotonously increasing function. As shown in FIG. 4, in the present embodiment, the auxiliary function F is defined by a function whose rate of increase (slope) becomes larger in accordance with the number of times of computation.

The end timing judgment section 152 judges the timing (end timing) to end the iterative computation based on the transition of the energy function E and the transition of the auxiliary function F in the course of the iterative computation. The end timing judgment section 152 includes a judging function setting section 1521 and a local minimum detection section 1522.

The judging function setting section 1521 sets the function (judging function G) expressed by the linear sum of the energy function E and the auxiliary function F. That is, the judging function G is a function expressed by (Expression 4) below.

$$G=E+F \quad \text{(Expression 4)}$$

The energy function E is a function that decreases in the course of iterative computation (see FIG. 3). Meanwhile, the auxiliary function F is a function that increases in the course of the iterative computation (see FIG. 4). Therefore, as schematically shown in FIG. 5, the judging function G is a function having a local minimum m.

The local minimum detection section 1522 monitors the transition of the judging function G while the iterative computation is executed. As described above, the judging function G has the local minimum m somewhere in the course of the iterative computation. The local minimum detection section 22 judges, as the end timing, a point of time when the local minimum m is detected in the course of the iterative computation.

<3. Flow of contour extraction process>

Figure 6:
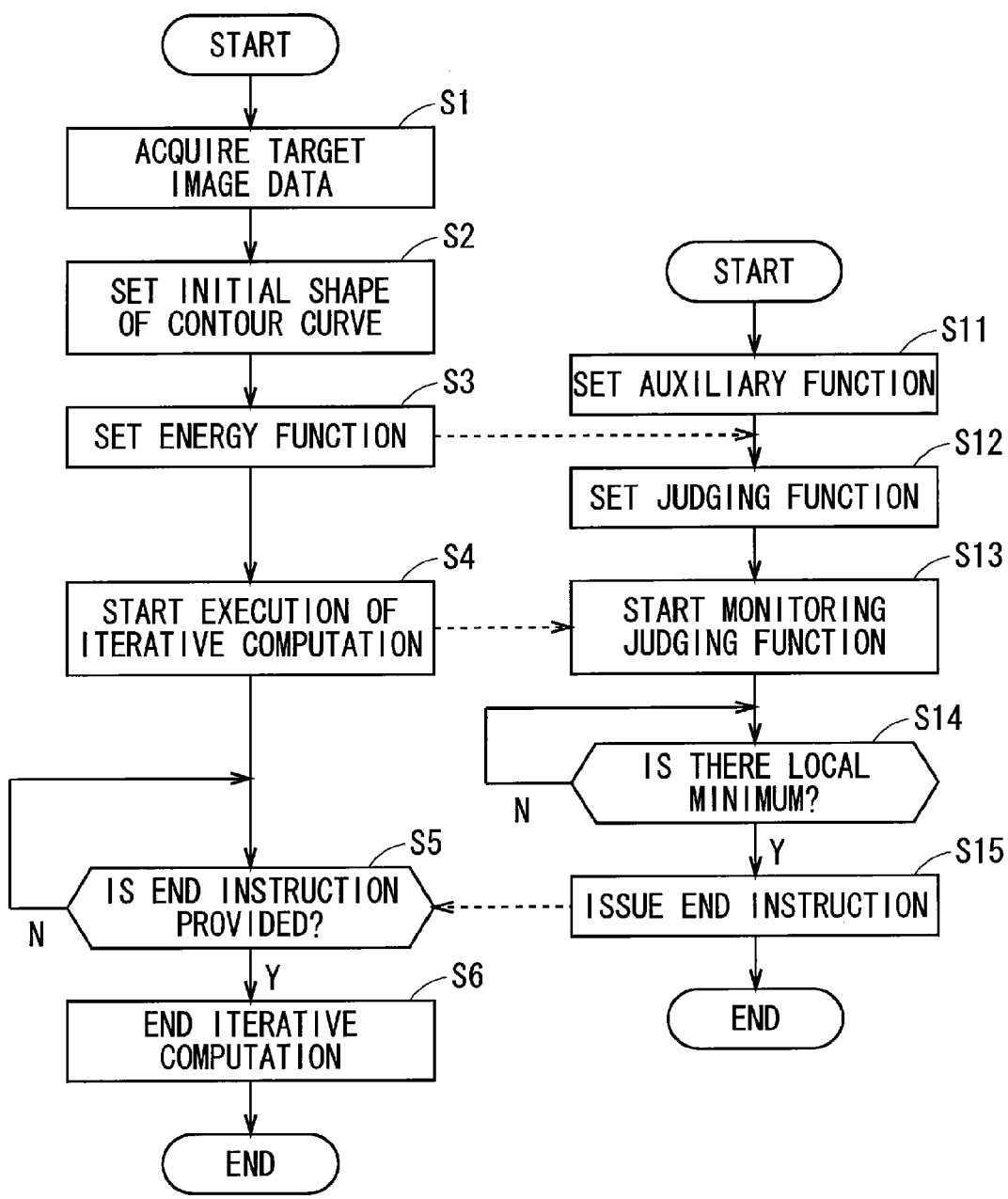
FIG. 6 is a chart showing a flow of a process executed in the contour extraction device.
Figure 7A:
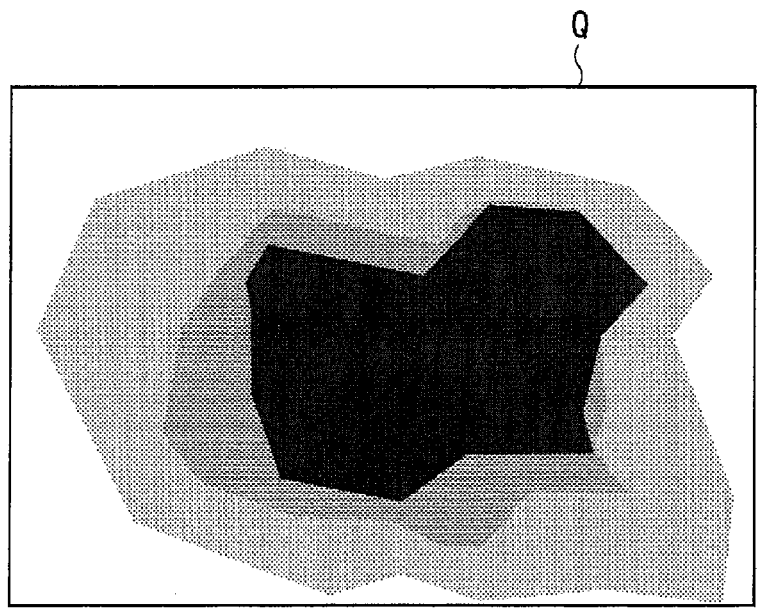
FIGS. 7A and 7B are diagrams schematically showing target image data and an initial active curve that is set for the target image data.
Figure 7B:
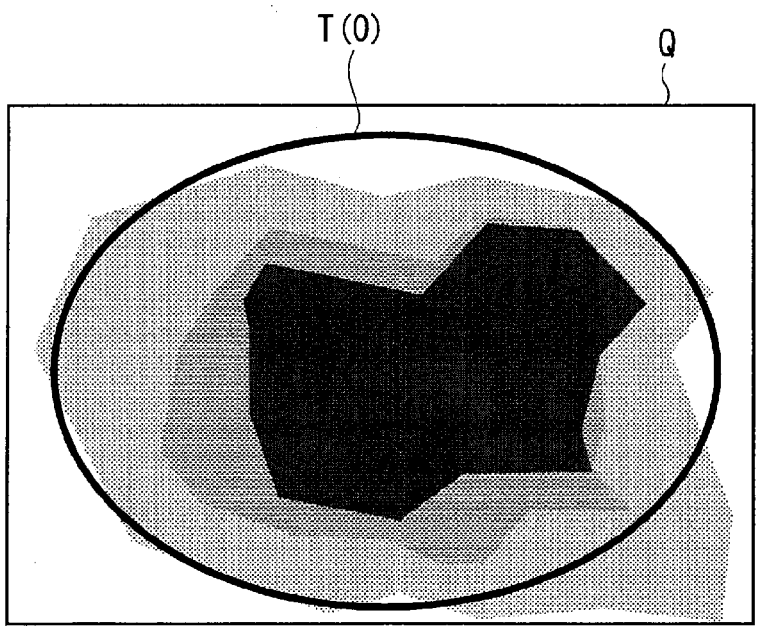
Figure 8A:
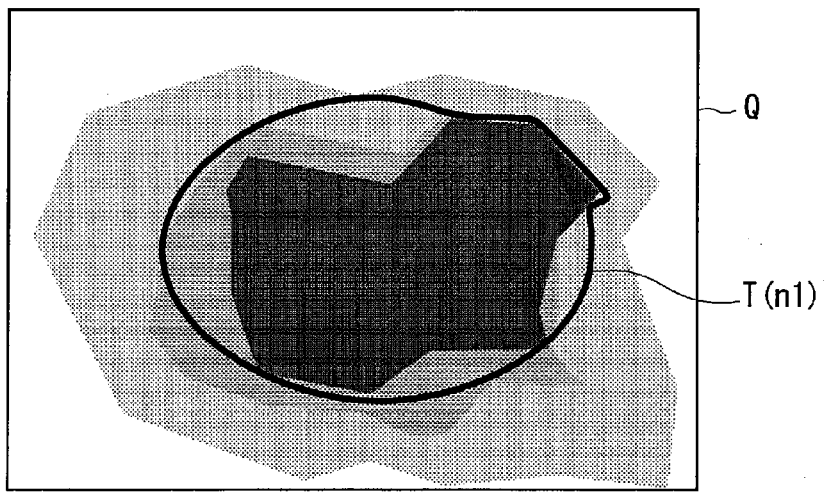
FIGS. 8A, 8B, and 8C are diagrams schematically showing a state of an active contour that is distorted in the course of iterative computation.
Figure 8B:
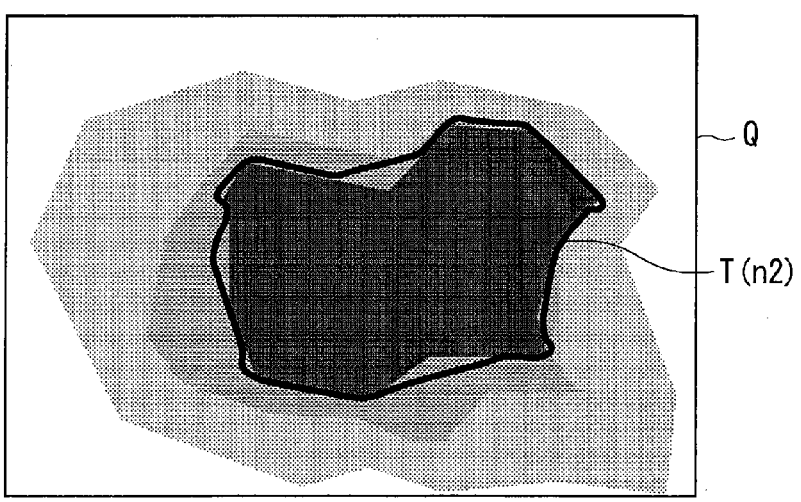
Figure 8C:
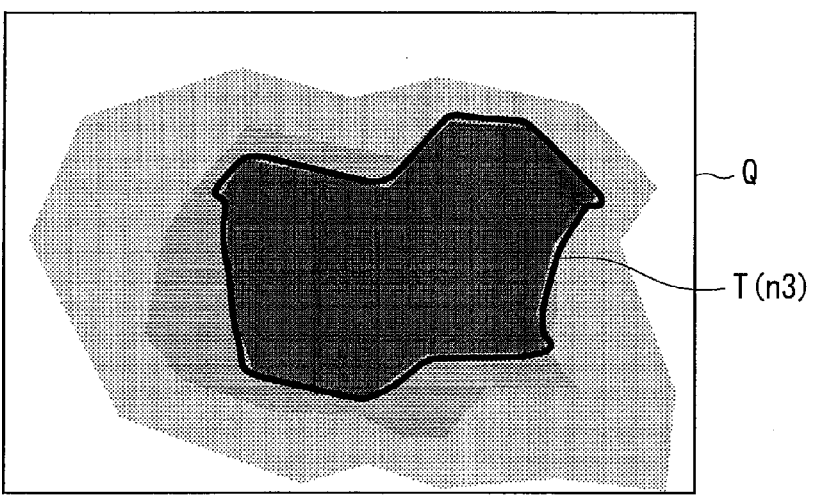

A flow of the process executed in the contour extraction device 1 is described with reference to FIG. 6. FIG. 6 is a chart showing a flow of the process executed in the contour extraction device 1. In the following description, FIG. 3 to FIG. 5, FIGS. 7A, 7B, and FIGS. 8A, 8B, and 8C are referred to as appropriate. FIG. 7A is a diagram schematically showing an example of the target image data. FIG. 7B is a diagram schematically showing an example of an initial active curve (initial active curve T(O)) that is set for the target image data shown in FIG. 7A. FIGS. 8A, 8B, and 8C are diagrams schematically showing the state of an active curve that is distorted in the course of iterative computation. In particular, FIG. 8A, FIG. 8B and FIG. 8C show the state of an active curve T(n1) when the number of times of computation is n1 (see FIG. 5), the state of an active curve T(n2) when the number of times of computation is n2 (see FIG. 5), and the state of an active curve T(n3) when the number of times of computation is n3 (see FIG. 5), respectively (where n1<n2<n3).

<3-1. Overall flow>

First, the overall flow of the process executed in the contour extraction device 1 is described. First, the image acquisition section 11 acquires the target image data (Step S1). It is assumed below that image data Q of an ultrasonic image shown in FIG. 7A is acquired as the target image data. In the ultrasonic image, a region of a blood vessel appears dark, and it is assumed here that the blood vessel is an object whose contour is to be extracted.

Then, the initial shape setting section 12 sets an initial shape of the active curve (initial active curve) (Step S2). The object is a blood vessel here, and the shape to be extracted is expected to be tubular. In view of the above, it is assumed here that a tubular initial active curve T(O) is set as shown in FIG. 7B.

Then, the energy function setting section 13 sets the energy function E (Step S3). It is assumed here that the function expressed by (Expression 2) above is set as the energy function E.

Then, the iterative computation processing section 14 starts the process of minimizing the energy function E through iterative computation (Step S4). The value of the energy function E decreases as the number of times of computation increases (see FIG. 5). The initial active curve T(0) set in Step S2 is distorted correspondingly, thereby approaching the contour of the object (see FIGS. 8A, 8B, and 8C).

The iterative computation processing section 14 continues the iterative computation until an end instruction is provided from the end instruction section 15. Upon provision of the end instruction from the end instruction section 15 (YES in Step S5), the iterative computation processing section 14 ends the iterative computation (Step S6). The thus obtained active curved is acquired as the final active curve.

<3-2. Flow of Process Executed by End Instruction Section 15>

Next, a flow of the process executed by the end instruction section 15 is described. Before the iterative computation processing section 14 starts iterative computing, the auxiliary function setting section 151 sets the auxiliary function F (see (Expression 3) and FIG. 4) (Step S11).

Then, the judging function setting section 1521 sets the judging function G (see (Expression 4) and FIG. 5) based on the energy function E set in Step S3 (see (Expression 2) and FIG. 3) and the auxiliary function F set in Step S11 (Step S12).

The iterative computation processing section 14 starts iterative computing (Step S4). Then, the local minimum detection section 1522 starts monitoring a transition of the judging function G set in Step S12 (Step S13), detects the appearance of the local minimum m in the judging function G (YES in Step S14), and judges that point of time as the end timing, thereby issuing an end instruction to the iterative computation processing section 14 (Step S15).

<4. Effects>

As shown in FIGS. 8A, 8B, and 8C, in iterative computing, the shape of the active curve is distorted and approaches the contour of the object as the number of times of computation increases, and the contour of the object is extracted more precisely along with an increased number of times of computation. Therefore, from the perspective of preciseness of contour extraction, it is desirable to continue iterative computation the number of times of computation n3 until the energy function E converges completely as shown in FIG. 5, to thereby acquire the active curve T(n3) on this occasion as the final active curve. Unfortunately, in many cases, the energy function E changes more gently as approaching the convergence as shown in FIG. 3, and accordingly the active curve does not experience the distortion commensurate with a calculation cost as the number of times of computation increases. Meanwhile, when the iterative computation is ended after being performed, for example, the number of times of computation n1 that is a relatively few for reducing calculation cost, the value of the energy function E has not been reduced sufficiently. This results in that the active curve T(n1) that has not sufficiently captured the contour of the object yet is acquired as the final active curve. As described above, in the contour extraction process, timing to end the iterative computation is important to appropriately balancing the preciseness of contour extraction and calculation cost.

In the embodiment described above, the end instruction section 15 sets the judging function G expressed by the linear sum of the energy function E of the active curve and the auxiliary function F that changes in accordance with the number of times of computation, and causes the iterative computation processing section 14 to end iterative computing when iterative computing is performed the number of times of computation (n2) when the local minimum m appears in the auxiliary function F. At the end timing determined in this manner, the preciseness of contour extraction and calculation cost are balanced in an appropriate manner.

That is, the value of the energy function E has been reduced to some extent (though it has not converged completely), whereby it is possible to acquire, as the final active curve, the active curve Tn2 that has captured the contour of the object in a sufficiently appropriate manner (though not completely). Moreover, the shape of the active curve is not expected to be distorted in proportion to calculation cost even though the iterative computation is continued further, and thus such inefficient computing is not performed.

In particular, it is possible to prevent calculation cost from increasing excessively while reliably securing the minimum-required preciseness of contour extraction by defining the auxiliary function F by a function whose rate of increase becomes larger in accordance with the number of times of computation.

<Second Embodiment>

A contour extraction device 1a according to a second embodiment of the present invention is described. The identical components to those described above are denoted by identical reference symbols below, which are not described.

<1. Hardware Configuration>

The hardware configuration of the contour extraction device 1a is identical to that of the contour extraction device 1 according to the first embodiment, which is not described (see FIG. 1).

<2. Functional Sections Related to Contour Extraction>

Figure 9:
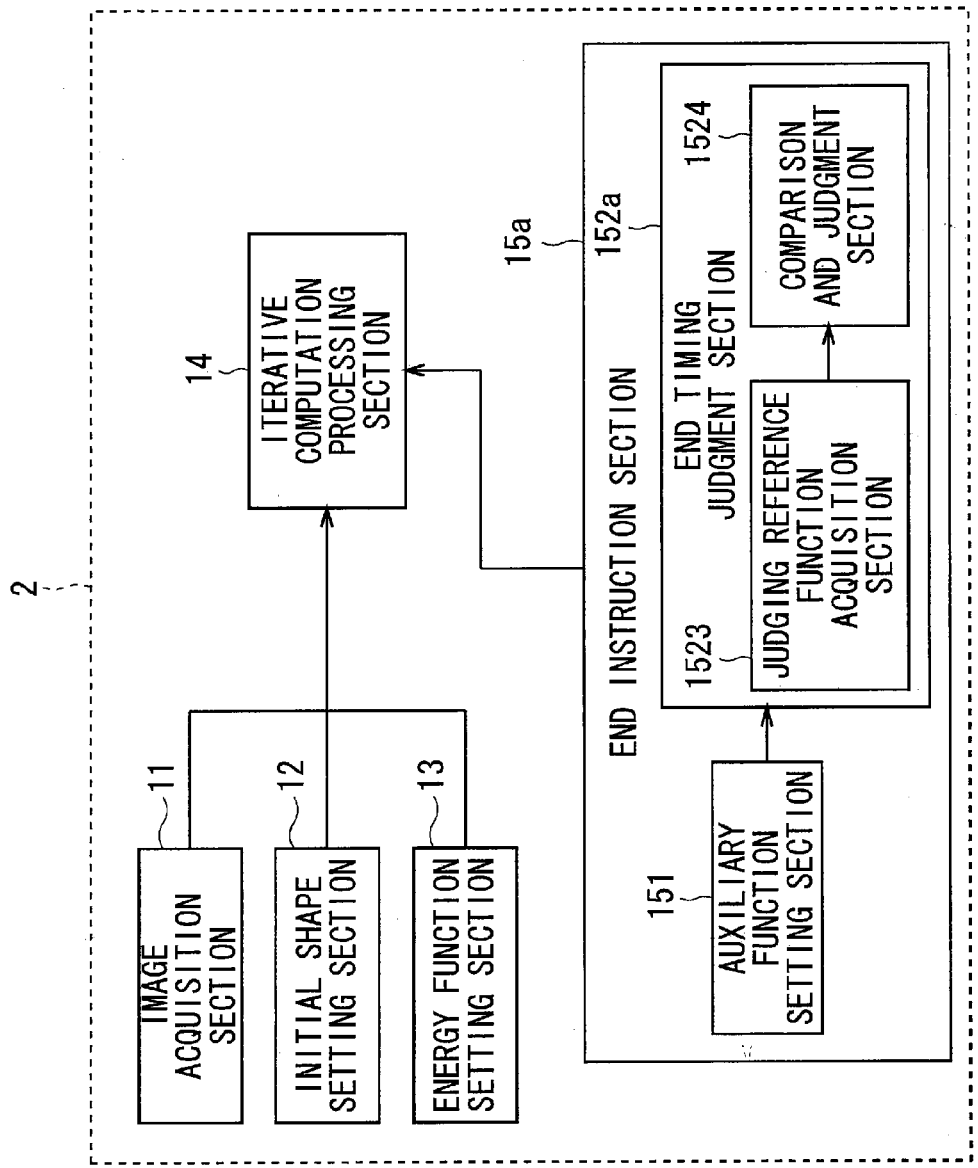
FIG. 9 is a block diagram showing the configuration related to the contour extraction function.

Similarly to the contour extraction device 1 according to the first embodiment, the contour extraction device 1a has a contour extraction function. The configuration for implementing the contour extraction function is described with reference to FIG. 9. FIG. 9 is a block diagram showing the configuration related to the contour extraction function. In the following description, FIG. 3 and FIG. 4 are referred to as appropriate.

The contour extraction device 1a includes the above-mentioned image acquisition section 11, initial shape setting section 12, energy function setting section 13 and iterative computation processing section 14 as the configuration related to the contour extraction function. Further, the contour extraction device 1a includes an end instruction section 15a described below in place of the above-mentioned end instruction section 15. The respective sections may be implemented thorough computing performed by the control section 2 in accordance with the program P stored in the storage section 6 or may be implemented by dedicated hardware.

The end instruction section 15a provides the iterative computation processing section 14 with an end instruction of iterative computation at a predetermined timing. The end instruction section 15a includes the above-mentioned auxiliary function setting section 151, and also includes an end timing judgment section 152a described below in place of the end timing judgment section 152 described above.

The end timing judgment section 152a judges the end timing based on a transition of the energy function E and a transition of the auxiliary function F in the course of the iterative computation. The end timing judgment section 152a includes a judging reference function acquisition section 1523 and a comparison and judgment section 1524.

The judging reference function acquisition section 1523 acquires a function (judging reference function H) that defines a value (reference value) serving as a reference for judging whether or not the energy function E has converged in the iterative computation. Specifically, the judging reference function acquisition section 1523 acquires the auxiliary function F set by the auxiliary function setting section 151 as the judging reference function H. That is, the judging reference function H is a function expressed by (Expression 5) below.

$$H=F \quad \text{(Expression 5)}$$

The auxiliary function F is a function that increases in the course of the iterative computation (see FIG. 4). Therefore, the judging reference function H is also the function that increases in the course of the iterative computation. That is, the reference value becomes larger as the iterative computation advance.

The comparison and judgment section 1524 monitors a transition of the energy function E while the iterative computation is executed. When the value of the energy function E becomes smaller than the reference value defined by the judging reference function H (that is, auxiliary function F), the comparison and judgment section 1524 considers that the energy function E has converged and judges that point of time as an end timing.

<3. Flow of Contour Extraction Process>

Figure 10:
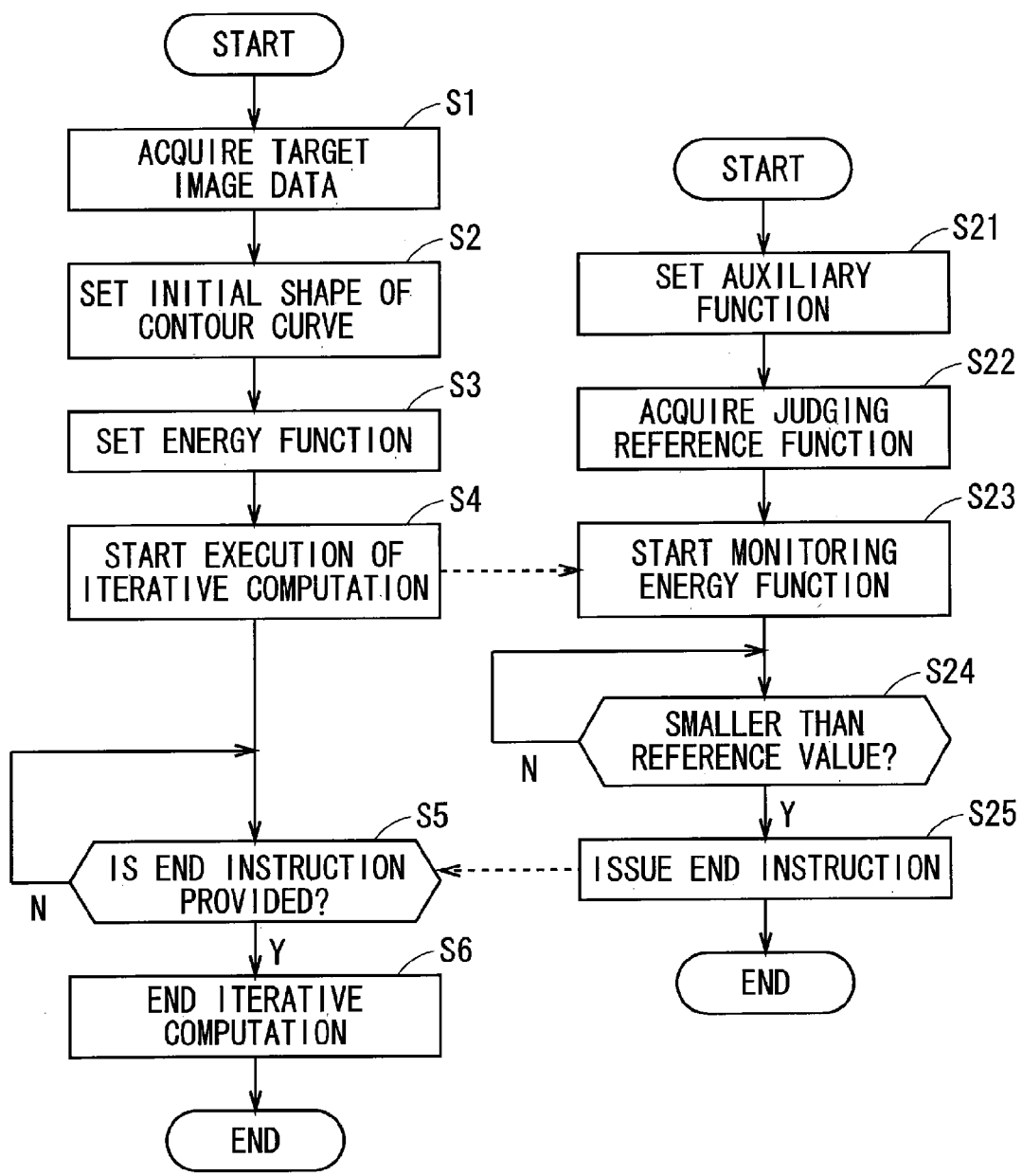
FIG. 10 is a chart showing the flow of the process executed in the contour extraction device.
Figure 11:
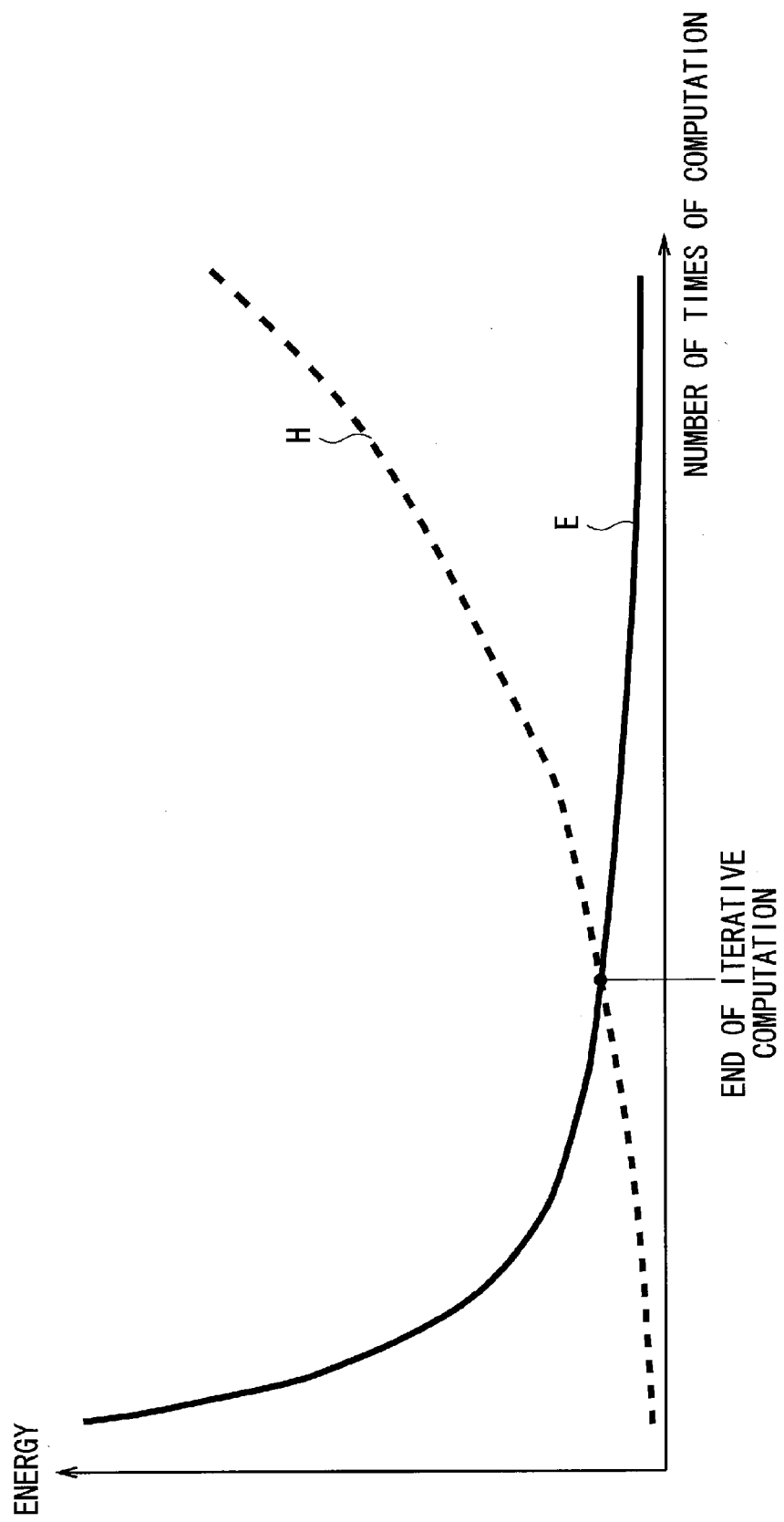
FIG. 11 is a figure for describing a process performed by an end indicating section.

A flow of the process executed in the contour extraction device 1a is described with reference to FIG. 10. FIG. 10 is a chart showing a flow of the process executed in the contour extraction device 1a. Note that FIG. 11 is referred to in the following description. FIG. 11 is a figure for describing the process executed by the end instruction section.

<3-1. Overall Flow>

An overall flow of the process executed in the contour extraction device 1a (Step S1 to Step S6) is identical to that of the first embodiment.

<3-2. Flow of Process Executed by End Instruction Section 15a>

A flow of the process executed by the end instruction section 15a is described. Before the iterative computation processing section 14 starts iterative computing, the auxiliary function setting section 151 sets the auxiliary function F (see (Expression 3) and FIG. 4) (Step S21).

Then, the judging reference function acquisition section 1523 acquires the auxiliary function F set in Step S21 as the judging reference function H (Step S22).

The iterative computation processing section 14 starts iterative computing (Step S4), and then the comparison and judgment section 1524 starts monitoring a transition of the energy function E set in Step S3 (Step S23). Then, the value of the energy function E becomes smaller than the reference value defined by the judgment reference function H (that is, auxiliary function F) (YES in Step S24), and then the comparison and judgment section 1524 considered that the energy function E has converged and judges that point of time as an end timing, thereby providing the iterative computation processing section 14 with an end instruction (FIG. 11) (Step S25).

<4. Effects>

Figure 12:
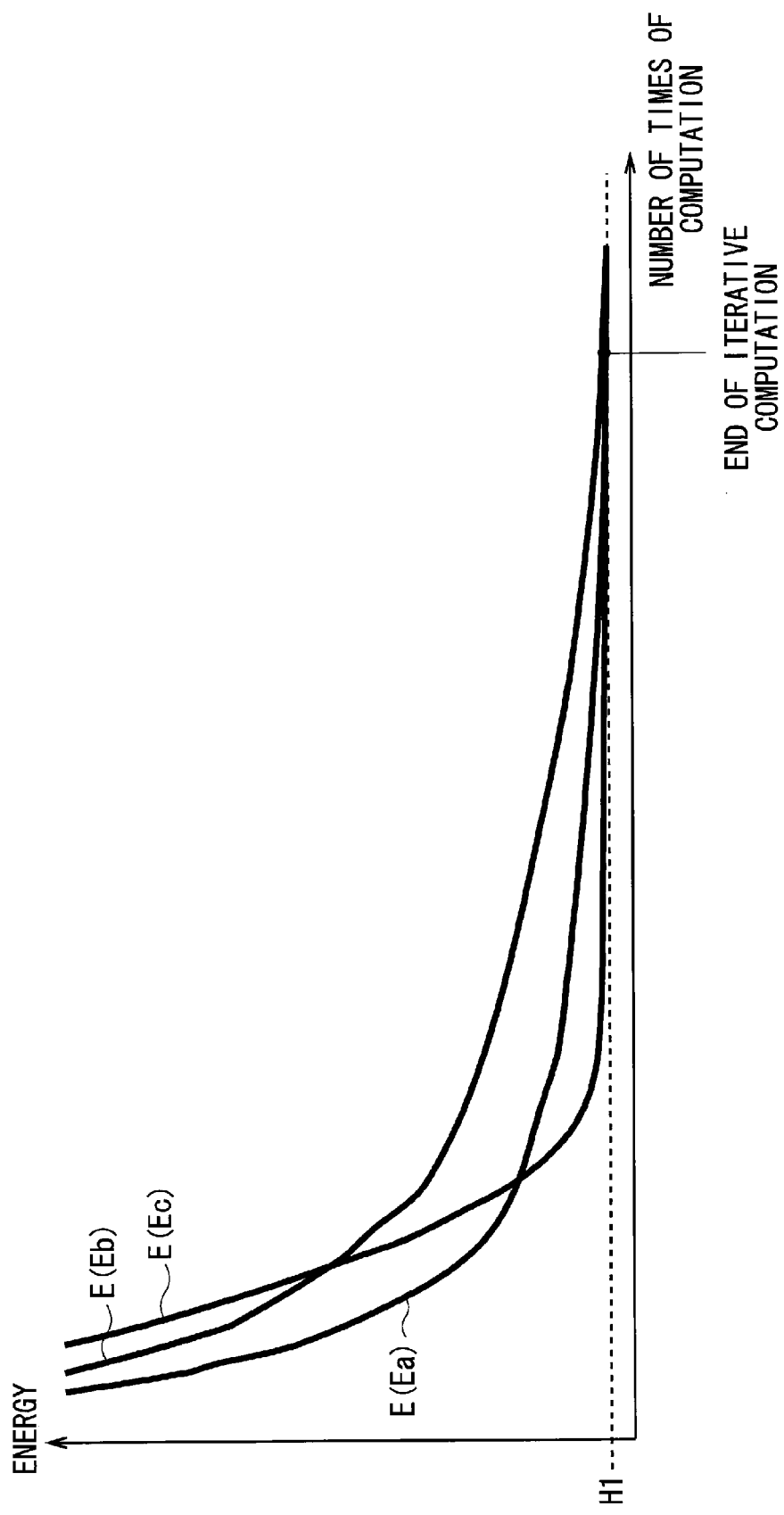
FIG. 12 is a figure for describing an end timing in a case where a given reference value is used.
Figure 13:
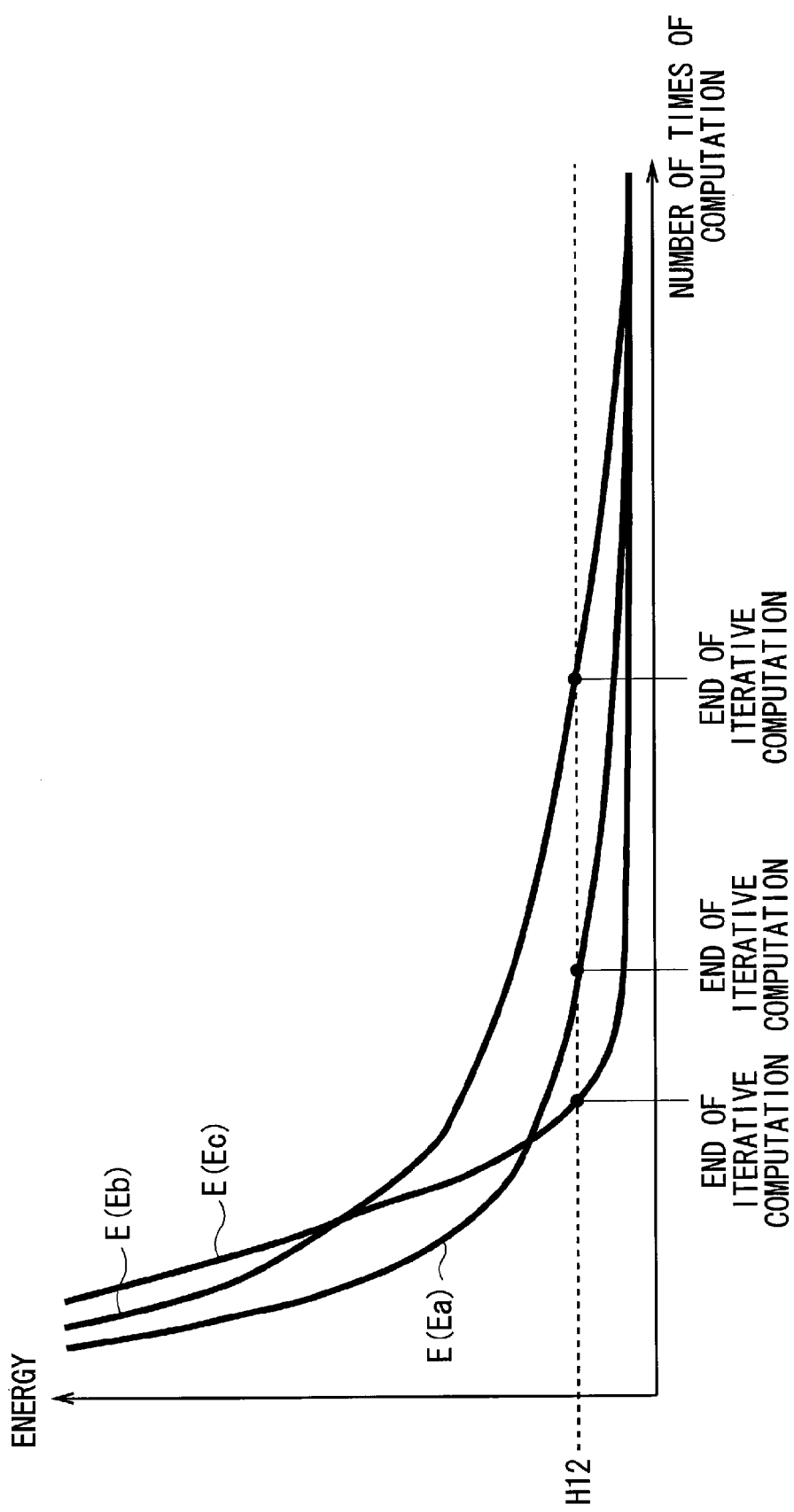
FIG. 13 is a figure for describing an end timing in a case where another given reference value is used.
Figure 14:
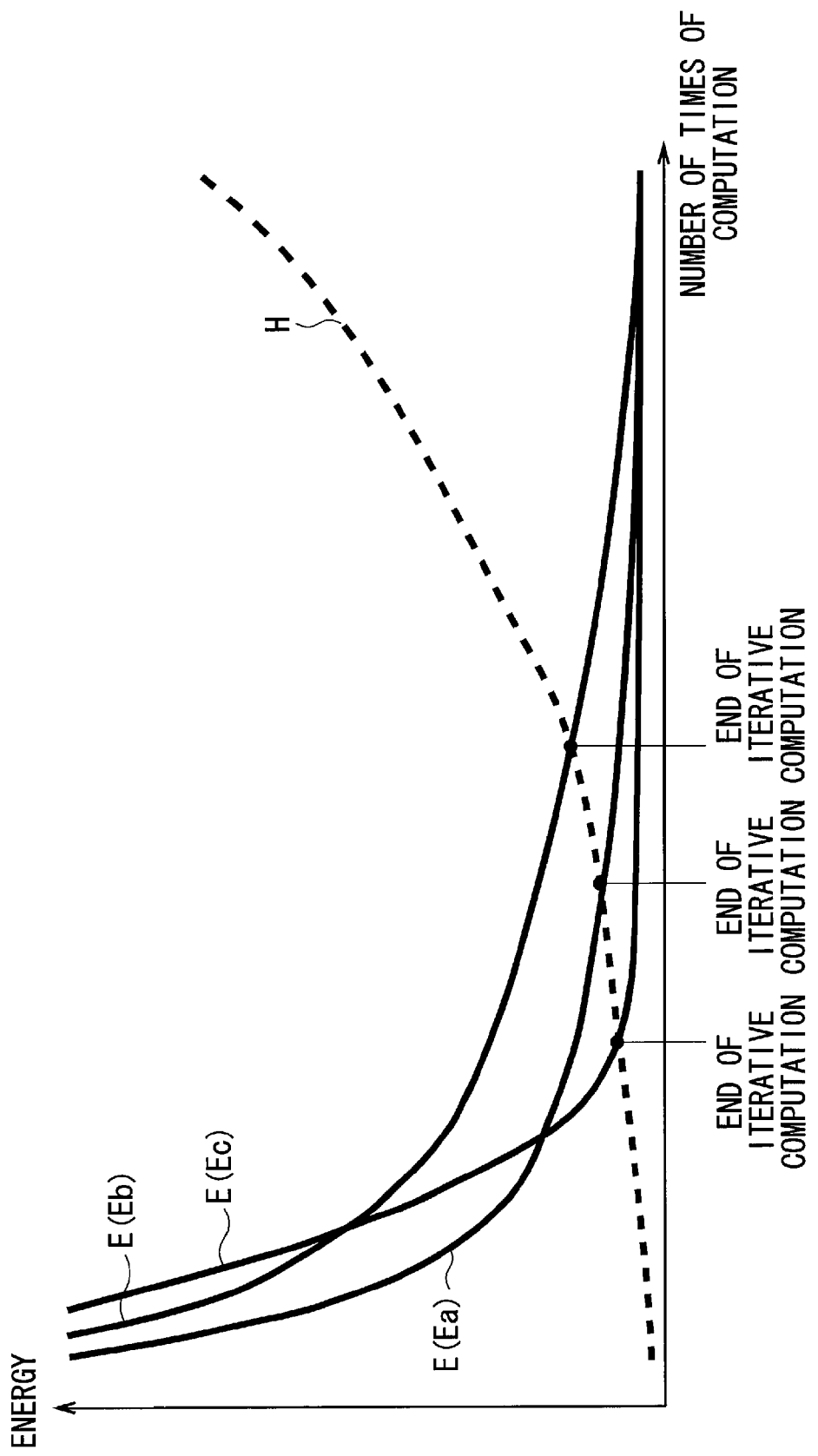
FIG. 14 is a figure for describing an end timing in a case where a judging reference function is used.

Effects achieved by the contour extraction device 1a according to the embodiment above are described with reference to FIG. 12 to FIG. 14. FIG. 12 to FIG. 14 respectively illustrate three kinds of energy functions Ea, Eb and Ec that change in different modes.

As described above, in iterative computing, a contour of an object can be extracted in the most precise shape by continuing the iterative computation until the energy function E converges completely. In judging whether or not the energy function E has converged, a preset reference value is used in some cases. That is, when the energy function E falls below the preset reference value, the energy function E is considered to have converged, and the iterative computation is ended at that point of time.

In order to capture the point of time when the energy function E has converged completely, the reference value needs to be set to a sufficiently small value H1 as shown in FIG. 12. As described above, however, the energy function E generally changes more gently as approaching the convergence, and accordingly the number of times of computation that is required for a smaller reference value increases considerably, which entails calculation cost.

Meanwhile, as shown in FIG. 13, when the reference value is set to a relatively large value H2 for limiting the number of times of computation to reduce calculation cost, in some cases, the iterative computation may be ended in the state in which the value of the energy function E is remote from the convergence depending on the changing mode of the energy function E (for example, see end timing of iterative computation of the energy function Ec). In such cases, unfortunately, the iterative computation is ended before the active curve captures a contour of an object sufficiently.

In the embodiment above, the end instruction section 15a uses the auxiliary function F that changes in accordance with the number of times of computation as the judging reference function H, and causes the iterative computation processing section 14 to end iterative computing when the value of the energy function E falls below the reference value defined by the judging reference function H. At the thus determined end timing, the preciseness of contour extraction and calculation cost are balanced in an appropriate manner.

That is, as shown in FIG. 14, the reference value is a relatively small value while the number of times of computation is small, and thus the energy function E is not considered to have converged unless it has a relatively small value. Therefore, it is possible to avoid the situation in which iterative computing is ended before the active curve captures the contour of an object sufficiently (for example, see end timing of iterative computation of the energy function Ec).

Meanwhile, the reference value is gradually changed to a larger value as the number of times of computation increases, and thus as a result of an increased number of times of computation, even the energy function E, which has not been converged completely in actuality, is considered to have converged, and iterative computing is ended. Therefore, even the energy function E that requires a considerable number of times of computation before complete convergence is capable of ending computing before the number of times of computation increases excessively (for example, see end timing of iterative computation of the energy function Eb).

In particular, it is possible to prevent calculation cost from increasing excessively while securing the minimum-required preciseness of contour extraction by defining the auxiliary function F by the function whose rate of increase becomes larger in accordance with the number of times of computation.

<Modifications>
<1. First Modification>

While the auxiliary function F is defined by the function whose rate of increase becomes larger in accordance with the number of times of computation in the respective embodiments above, the auxiliary function may be a function in any shape as long as it is a monotonously increasing function. For example, the auxiliary function F may be a linear function or quadratic function.

In particular, the contours in accordance with various objects (applications) can be extracted by setting the auxiliary function F according to the object for performing contour extraction (application in which contour extraction is used).

For example, setting of the auxiliary function F using the function whose rate of increase is relatively large enables to specify a contour of an object at low calculation cost in a short period of calculation time. Therefore, the above-mentioned auxiliary function F may be set in the case of the application that is required to specify a contour of an object, not matter how coarse the contour is, at low calculation cost in a short period of calculation time.

Meanwhile, a contour of an object can be specified precisely if the auxiliary function F is set using the function whose rate of increase is relatively small. Therefore, the above-mentioned auxiliary function F may be set in the case of an application required to precisely specify the contour of an object no matter how much calculation cost and calculation time are required.

<2. Second Modification>

The end instruction section 15 according to the first embodiment is configured to judge an end timing with the use of the judging function G. The judging function G used herein is expressed by the linear sum of the energy function E and the auxiliary function F, but may be expressed by a weighted linear sum of those functions E and F. For example, in the case where the weighing factor is added to the auxiliary function F, the judgment factor G is a function expressed by (Expression 6) below. In (Expression 6), "Wf" represents a weighting factor added to the auxiliary function F.

$$G=E+Wf*F \quad \text{(Expression 6)}$$

The value of the weighting factor Wf is a value for defining how to balance the preciseness of contour extraction and calculation cost, which is desired to be set in accordance with an object of performing contour extraction (application in which contour extraction is performed).

For example, the weighting factor Wf having a relatively large value increases the effect of the auxiliary function F. The auxiliary function F refers to the force acting for reducing the number of times of iterative computation (that is, for accelerating an end timing), which enables to extract the contour of an object while reducing calculation cost in this case. Accordingly, in a case where, for example, contour extraction is used for an application required to extract a contour of an object, not matter how rough the contour is, quickly while reducing calculation cost, it suffices that the value of the weighting factor Wf is set to be a relatively large value.

Meanwhile, the weighting factor Wf having a relatively small value increases the effect of the energy function E. In this case, a contour of an object can be extracted precisely. Therefore, in the case where, for example, contour extraction is used for an application required to precisely extract the contour of an object no matter how much time and calculation cost are required, it suffices that the value of the weighting factor Wf is set to a relatively small value.

As described above, in the present modification, it is possible to perform contour extraction in accordance with an object of performing contour extraction (application in which contour extraction is used) by adjustment of the value of the weighting factor Wf.

<3. Third Modification>

The end instruction section 15a according to the second embodiment is configured to judge an end timing with the use of the judging reference function H. While the configuration above is made such that the auxiliary function F is used as the judging reference function H without any change, the configuration may be made such that the function obtained by adding a factor to the auxiliary function F is used as the judging reference function H. In this case, the judging reference function H is a function expressed by (Expression 7) below. Note that "Wh" of (Expression 7) represents the factor added to the auxiliary function F.

$$H=Wh*F \quad \text{(Expression 7)}$$

Similarly to the above-mentioned weighting factor Wf, the value of the factor Wh is a value for defining how to balance the preciseness of contour extraction and calculation cost, which is desired to be set in accordance with an object of performing contour extraction.

For example, the factor Wh having a value larger than one makes the value of the reference value for defining an end timing large, which accelerates the end timing. In this case, it is possible to extract a contour of an object quickly while reducing calculation cost. Therefore, in a case where, for example, contour extraction is used for an application desired to quickly extract a contour of an object, not matter how rough the contour is, while reducing calculation cost, it suffices that the value of the factor Wh is set to be a value larger than one.

Meanwhile, the factor Wh having a value smaller than one makes the value of the reference value for defining an end timing small, which delays the end timing. In this case, it is possible to precisely extract a contour of an object though calculation cost is required to some extent at times. Therefore, in a case where, for example, contour extraction is used for an application desired to precisely extract a contour of an object while it is allowed to entail time and calculation cost, it suffices that the value of the factor Wh is set to be a value smaller than one.

As described above, in the present modification, it is possible to perform contour extraction in accordance with an object of performing contour extraction (application in which contour extraction is used) by adjusting the value of the factor Wh.

<4. Fourth Modification>

The respective embodiments described above are based on the premise that the energy function E is a function that decreases smoothly in the course of iterative computation, and originally, the energy function E should be such a function. However, in an actual implementation, slight oscillation or the like (noise) occurs in the energy function E in some cases. For example, in a case where re-initialization is performed in the course of iterative computation, the energy function E momentarily experiences a minuscule increase. This leads to a possibility that the end timing cannot be appropriately determined by the energy function E containing such noise.

In order to avoid this, it suffices that an approximate energy function obtained by removing noise from the energy function E is acquired and this approximately energy function is used in place of the energy function E. The approximate energy function may be acquired by any method. For example, discrete sampling data may be obtained by sampling the value of the energy function E at given time intervals and the curve defined by the obtained value may be obtained as an approximate energy function. Alternatively, the curve obtained by approximating the energy function E by, for example, the least square method may be obtained as the approximate energy function.

<5. Other Modifications>

The respective embodiments described above are applicable to contour extraction devices that extract a contour of an object with the use of various active contour models (such as level set and snakes).

Description of Symbols 1, 1a contour extraction device
2 control section
11 image acquisition section
12 initial shape setting section
13 energy function setting section
14 iterative computation processing section
15, 15a end instruction section
151 auxiliary function setting section
152,152a end timing judgment section
1521 judging function setting section
1522 local minimum detection section
1523 judging reference function acquisition section
1524 comparison and judgment section
P program

The invention claimed is:

1. A contour extraction device that extracts a contour of an object using an active contour model, comprising:
   an image acquisition section that acquires a target image obtained by imaging a natural object;
   an initial shape setting section that sets an initial shape of an active curve for extracting the contour of the object appearing on said target image;
   an energy function setting section that sets an energy function, the energy function being expressed by a weighted linear sum of a plurality of kinds of energy terms defined correspondingly to a state of said active curve and being formulated so as to have a smaller value as approaching a shape of a contour to be extracted;
   an iterative computation section that minimizes said energy function by an iterative computation;
   an auxiliary function setting section that sets an auxiliary function formulated so as to change in accordance with the number of iteration times of said iterative computation; and
   an end timing judgment section that judges an end timing to end said iterative computation based on a transition of said energy function in the course of said iterative computation and a transition of said auxiliary function in the course of said iterative computation.

2. The contour extraction device according to claim 1, wherein said auxiliary function is a function formulated so as to monotonously increase in accordance with said number of iteration times.

3. The contour extraction device according to claim 2, wherein said auxiliary function is a function whose rate of increase becomes larger in accordance with said number of iteration times.

4. The contour extraction device according to claim 2, wherein:
   said end timing judgment section includes a judging function setting section that sets a judging function expressed by a linear sum of said energy function and said auxiliary function; and
   said end timing judgment section judges a point of time when a local minimum appears in said judging function in the course of said iterative computation as said end timing.

5. The contour extraction device according to claim 2, wherein said end timing judgment section judges, as said end timing, a point of time when a value of said energy function is smaller than a value of said auxiliary function in the course of said iterative computation.

6. A program that is stored in a computer and is executed in said computer to cause said computer to function as a contour extraction device that extracts a contour of an object using an active contour model, wherein said contour extraction device comprises:
   an image acquisition section that acquires a target image obtained by imaging a natural object;
   an initial shape setting section that sets an initial shape of an active curve for extracting a contour of an object appearing on said target image;
   an energy function setting section that sets an energy function, the energy function being expressed by a weighted linear sum of a plurality of kinds of energy terms defined correspondingly to a state of said active curve and being formulated so as to have a smaller value as approaching a shape of a contour to be extracted;
   an iterative computation section that minimizes said energy function by an iterative computation;
   an auxiliary function setting section that sets an auxiliary function formulated so as to change in accordance with the number of iteration times of said iterative computation; and
   an end timing judgment section that judges an end timing to end said iterative computation based on a transition of said energy function in the course of said iterative computation and a transition of said auxiliary function in the course of said iterative computation.

* * * * *